(12) United States Patent
Ma

(10) Patent No.: US 9,292,264 B2
(45) Date of Patent: Mar. 22, 2016

(54) MOBILE DEVICE USER INTERFACE ADVERTISING SOFTWARE DEVELOPMENT KIT

(71) Applicant: Paschar LLC, San Francisco, CA (US)

(72) Inventor: Peter Ma, San Francisco, CA (US)

(73) Assignee: Paschar LLC, San Francisco, CA (US)

( * ) Notice: Subject to any disclaimer, the term of this patent is extended or adjusted under 35 U.S.C. 154(b) by 286 days.

(21) Appl. No.: 13/836,283

(22) Filed: Mar. 15, 2013

(65) Prior Publication Data

US 2014/0282126 A1 Sep. 18, 2014

(51) Int. Cl.
*G06F 3/00* (2006.01)
*G06F 9/44* (2006.01)
*G06Q 30/02* (2012.01)

(52) U.S. Cl.
CPC .. *G06F 8/38* (2013.01); *G06F 8/34* (2013.01); *G06Q 30/0241* (2013.01)

(58) Field of Classification Search
USPC .................................. 715/762, 765, 779, 790
See application file for complete search history.

(56) References Cited

U.S. PATENT DOCUMENTS

| | | | |
|---|---|---|---|
| 6,590,568 | B1 | 7/2003 | Astala et al. |
| 7,752,566 | B1 | 7/2010 | Nelson |
| 7,864,163 | B2 | 1/2011 | Ording et al. |
| 8,046,672 | B2 | 10/2011 | Hedge et al. |
| 8,127,240 | B2 | 2/2012 | Grotjohn et al. |
| 8,250,454 | B2 | 8/2012 | Farouki et al. |
| 8,291,349 | B1 | 10/2012 | Park et al. |
| 8,316,031 | B2 | 11/2012 | Amer et al. |
| 2002/0129089 | A1 | 9/2002 | Hedge et al. |
| 2003/0233425 | A1 | 12/2003 | Lyons et al. |
| 2005/0159188 | A1 | 7/2005 | Maas et al. |
| 2006/0282316 | A1 | 12/2006 | Snyder et al. |
| 2007/0042760 | A1 | 2/2007 | Roth |

(Continued)

FOREIGN PATENT DOCUMENTS

| | | |
|---|---|---|
| EP | 1083504 A2 | 3/2001 |
| EP | 1193635 A1 | 4/2002 |

(Continued)

OTHER PUBLICATIONS

International Search Report and Written Opinion dated, Aug. 1, 2014.

(Continued)

*Primary Examiner* — Anil N Kumar
(74) *Attorney, Agent, or Firm* — Hansen IP Law PLLC

(57) ABSTRACT

A software development kit for providing advertising in a mobile device user interface is provided. The software development kit includes computer executable program instructions for generating a wrapper view object that wraps an advertising corner control view object. The kit allows an application developer to create an application interface and wrap it in the wrapper view object. When the resulting computer executable instructions are executed, a user interface is displayed with an advertising corner control interface area and an application interface area. The user can select the advertising corner control interface area using a first selection technique to display an advertising interface area and remove the advertising control interface area and the application interface area. The user can select the advertising corner control interface area using a second technique to remove the application corner control interface area while continuing to display the application interface area.

25 Claims, 5 Drawing Sheets

(56) References Cited

U.S. PATENT DOCUMENTS

| | | |
|---|---|---|
| 2007/0294710 A1 | 12/2007 | Meesseman |
| 2008/0244654 A1 | 10/2008 | Angiolillo |
| 2008/0281689 A1 | 11/2008 | Blinnikka et al. |
| 2008/0319844 A1 | 12/2008 | Hua et al. |
| 2009/0222851 A1 | 9/2009 | Talmi |
| 2010/0037204 A1 | 2/2010 | Lin et al. |
| 2010/0087230 A1* | 4/2010 | Peh et al. ............ 455/566 |
| 2010/0124913 A1 | 5/2010 | Cox |
| 2010/0146079 A1 | 6/2010 | Bramley et al. |
| 2010/0198697 A1* | 8/2010 | Brown et al. ............ 705/14.73 |
| 2010/0199180 A1 | 8/2010 | Brichter |
| 2011/0125594 A1 | 5/2011 | Brown et al. |
| 2011/0213655 A1 | 9/2011 | Henkin et al. |
| 2011/0231265 A1 | 9/2011 | Brown et al. |
| 2011/0238496 A1 | 9/2011 | Gurbuxani et al. |
| 2011/0249086 A1 | 10/2011 | Guo et al. |
| 2011/0320944 A1 | 12/2011 | Nikara et al. |
| 2011/0320956 A1 | 12/2011 | Singh et al. |
| 2012/0030569 A1 | 2/2012 | Migos et al. |
| 2012/0041822 A1 | 2/2012 | Landry et al. |
| 2012/0089466 A1* | 4/2012 | Froloff ............ 705/14.71 |
| 2012/0143697 A1 | 6/2012 | Chopra et al. |
| 2012/0158515 A1 | 6/2012 | K. |
| 2012/0159314 A1* | 6/2012 | Schrier et al. ............ 715/252 |
| 2012/0166267 A1 | 6/2012 | Beatty et al. |
| 2012/0173331 A1 | 7/2012 | Dangaltchev et al. |
| 2012/0180029 A1 | 7/2012 | Hill et al. |
| 2012/0220277 A1 | 8/2012 | Gonynor |
| 2012/0233589 A1 | 9/2012 | Mruthyunjaya et al. |
| 2012/0243804 A1 | 9/2012 | Butler |
| 2012/0246588 A1 | 9/2012 | Petersen et al. |
| 2012/0253922 A1 | 10/2012 | Baluja |
| 2012/0289188 A1 | 11/2012 | Marcus |
| 2012/0310826 A1 | 12/2012 | Chaterjee |
| 2012/0313956 A1 | 12/2012 | Zhou et al. |
| 2013/0024251 A1 | 1/2013 | Preiss et al. |
| 2013/0173400 A1 | 7/2013 | Koornneef et al. |

FOREIGN PATENT DOCUMENTS

| | | |
|---|---|---|
| EP | 1929436 A2 | 6/2008 |
| EP | 1777917 B1 | 1/2009 |
| EP | 2038831 A1 | 3/2009 |
| EP | 2196954 A1 | 6/2010 |
| EP | 2317462 A1 | 5/2011 |
| EP | 2378479 A1 | 10/2011 |
| WO | 2004072884 A1 | 8/2004 |
| WO | 2007024437 A2 | 3/2007 |
| WO | 2008005099 A1 | 1/2008 |
| WO | 2009002894 A2 | 12/2008 |
| WO | 2012154440 A2 | 11/2012 |

OTHER PUBLICATIONS

International Search Report and Written Opinion for PCT/US2014/056202 dated, Dec. 31, 2014.

Mani.S, PowerPoint on Containers and UIs, from http://iserveandroid.blogspot.com/.

"Key Concepts—Bananas UI Toolkit Developer's Guide;" From: http://tivohme.sourceforge.net/docs/bananas/02_KeyConcepts.html. Printed from the Internet on Jan. 28, 2013.

Definition of software developer's kit (SDK); "software developer's kit (SDK);" From: http://searchcio-midmarket.techtarget.com/definition/software-developers.

"Android Basic XML Layouts," Notes based on: "The Busy Coder's Guide to Android Development," by Mark L. Murphy Copyright 2008-2009, CommonsWare LLC. ISBN: 978-0-9816780-0-9 & Android Developers: http://developer.android.com/index.html.

Non-Final Office Action for U.S. Appl. No. 13/886,811 dated Mar. 11, 2015.

Response as-filed on Apr. 27, 2015 to the Mar. 11, 2015 Non-Final Office Action for U.S. Appl. No. 13/886,811.

* cited by examiner

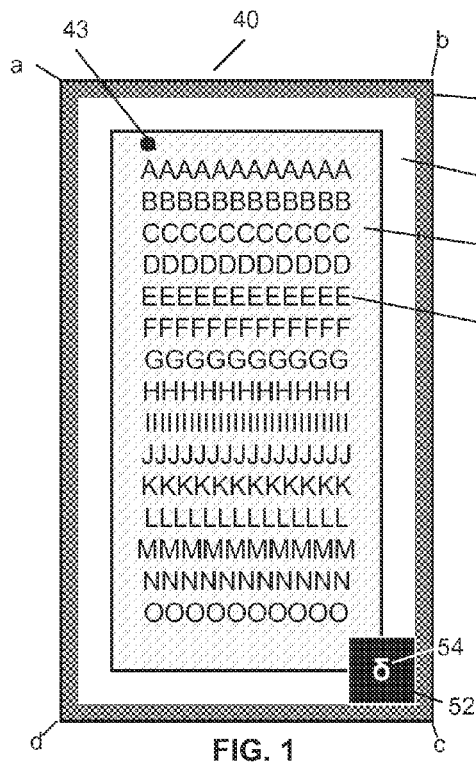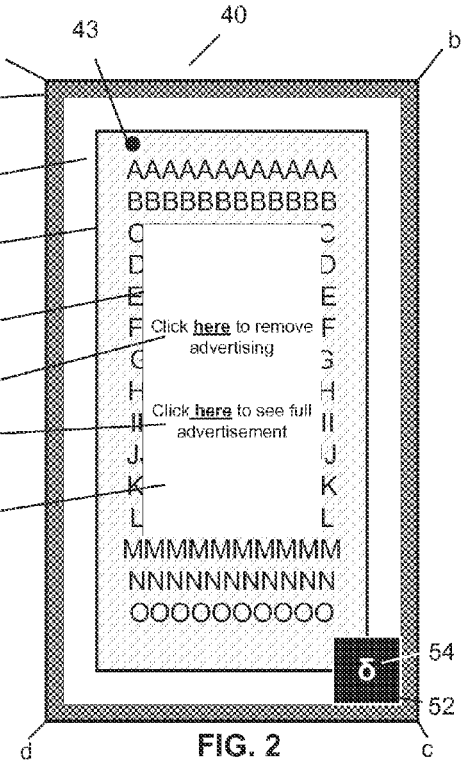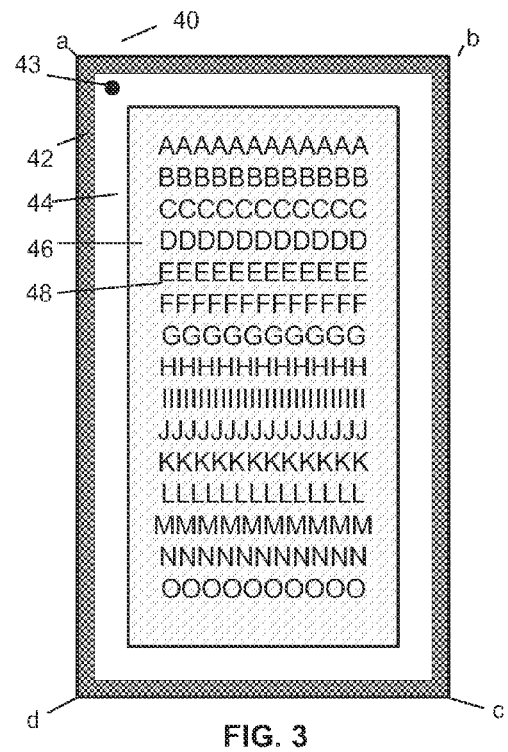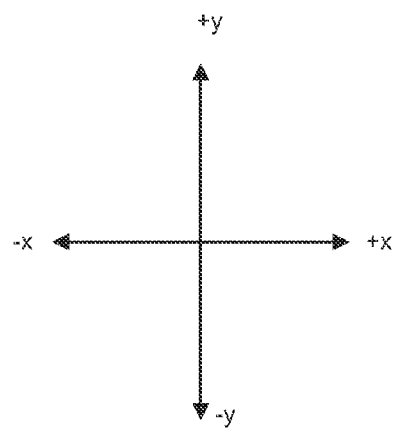

US 9,292,264 B2

MOBILE DEVICE USER INTERFACE ADVERTISING SOFTWARE DEVELOPMENT KIT

FIELD

The present disclosure relates to techniques for providing advertising with mobile device applications, and more specifically, to software development kits that include an advertising control interface view object.

BACKGROUND

With the advent of mobile devices such as iPhones, iPads, Android Tablets, hybrid tablets, and the iPod Touch, application developers have provided large numbers of applications or "apps" that allow users to perform a wide variety of different tasks. Applications allow users to process, receive and transmit an endless array of information in the form of text, images, sounds, animations, and video. While some application developers choose to charge subscription fees for access to their applications, others choose to make the applications free to users and to generate revenue from advertisements presented to users in connection with the applications. However, known advertising techniques suffer from several drawbacks.

One common type of advertisement is the "banner" advertisement often shown at the bottom of a mobile device display. Known banner advertisements often consume excess display area and are re-sized to consume additional area when the mobile device is rotated from a portrait to landscape orientation or vice-versa. The excess area that is consumed is wasteful and could otherwise be used to display application content.

In addition, certain known banner advertisements provide no means by which the user can "opt-out" or dismiss the advertising. While some other known banner advertisements provide a means for dismissing the advertising, the selectable area on the display for doing so is often a fraction of the banner area on the mobile device display. As a result, the selectable area for dismissing the advertising is quite small, on the order of 10×10 or 20×20 pixels, which makes precise selection difficult. This in turn makes it more likely that users with no interest in the advertised subject matter will inadvertently select the banner and be directed to a larger advertisement or the advertiser's website, making their selection a poor indicator of their actual interest and buying potential. Also, many known advertising techniques provide static banner advertising that cannot be dynamically updated or changed based on a user's interest level.

Many applications for mobile devices include "scrollable" content that the user can access by moving a finger or stylus in a particular direction along the mobile device display. In certain known applications, any advertising that is initially displayed with the content is "scrolled away" or lost when the content is scrolled because its position on the display is fixed with respect to the content itself. Thus, once the content is no longer visible, the advertisement is no longer visible, which is undesirable from the advertiser's perspective.

Also, application developers are typically required to create the advertising interface area that appears within their application interface area on the mobile device display, which requires extra coding effort on their part. Thus, it would be desirable to develop an advertising solution that application developers can seamlessly integrate with their applications.

Thus, a need has arisen for a mobile device advertising solution that addresses the foregoing issues.

BRIEF DESCRIPTION OF THE DRAWINGS

The disclosure will now be described, by way of example, with reference to the accompanying drawings, in which:

FIG. 1 is front elevational view of a mobile device in a first (portrait) rotational orientation in a plane perpendicular to the Earth's surface with the mobile device in a first operative state displaying a first user interface comprising an advertising corner control interface area and an application user interface area;

FIG. 2 is a front elevational view of the mobile device of FIG. 1 in the first (portrait) rotational orientation and in a second operative state displaying a second user interface comprising an advertising corner control interface area, an application user interface area, and a pop-up menu overlaid on the application user interface area;

FIG. 3 is a front elevational view of the mobile device of FIG. 1 in the first (portrait) rotational orientation and a third operative state displaying a fourth user interface comprising an application interface area without an advertising corner control interface area;

DETAILED DESCRIPTION

Figure 4:
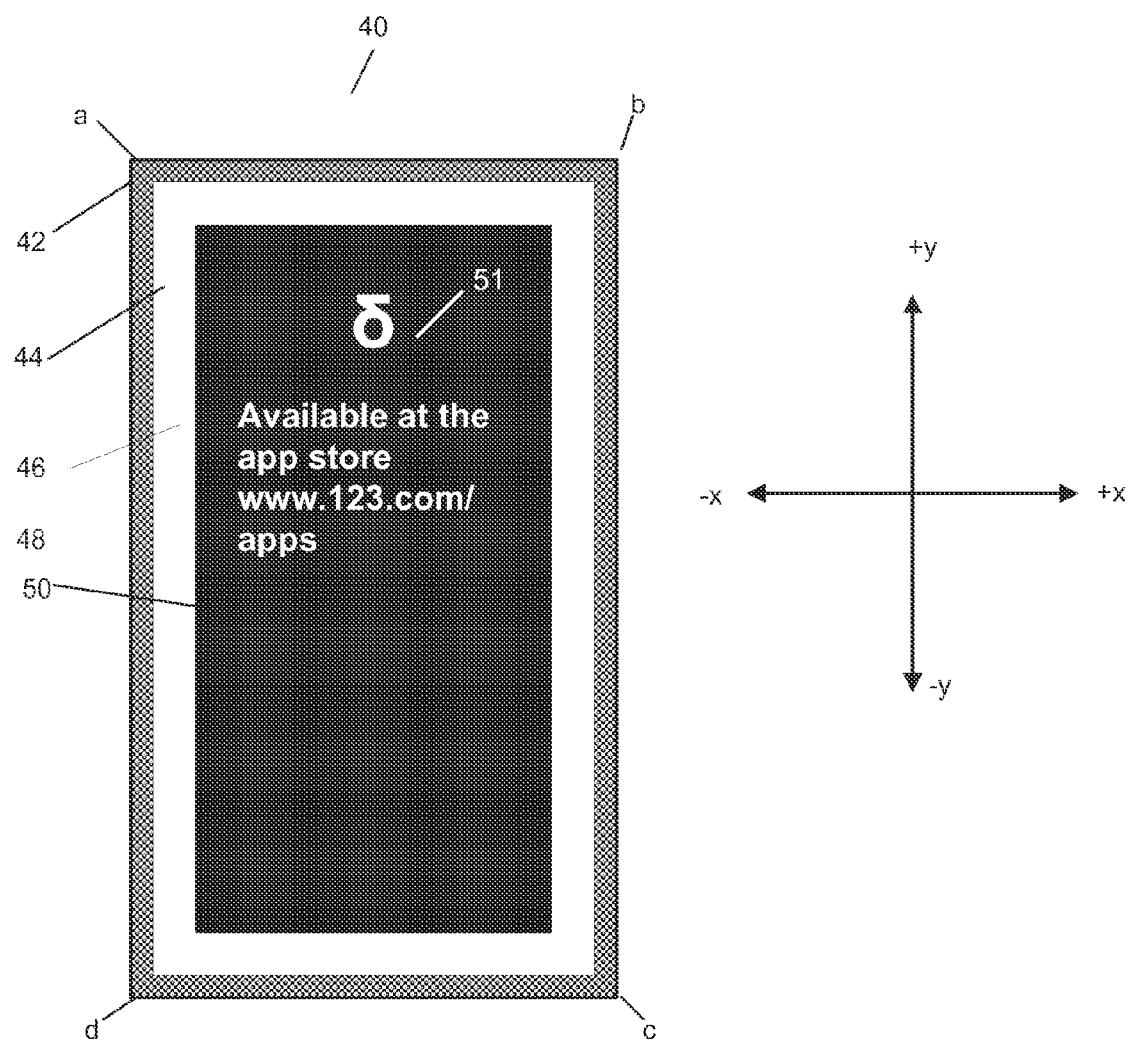
FIG. 4 is a front elevational view of the mobile device of FIG. 1 the first (portrait) rotational orientation and in fourth operative state displaying a fifth user interface comprising an advertising interface area.

The present disclosure relates to user interfaces for mobile devices, including mobile smart devices and mobile smart phones, and more particularly, to techniques for providing advertising on graphical user interfaces (GUIs) for such mobile devices. Examples of such mobile devices include the iPhone, Samsung Galaxy, iPad, Android Tablets, hybrid tablets, and the iPod Touch. In general, such mobile devices are portable, handheld devices that communicate wirelessly with other mobile devices and networks and which include the capability of transmitting, receiving, processing, and displaying digital data.

In certain examples, a software development kit is provided which includes computer executable instructions for generating an advertising corner control interface area on a mobile device display. A user can select the advertising corner control interface area to cause an advertising interface area to be visible on the display. The advertising interface area includes an advertisement with content that is related to the content of a graphic displayed in the advertising corner control interface area.

In other examples, a method of accessing advertising on a mobile device is provided. The method comprises displaying a first user interface that includes an application interface area and an advertising corner control interface area on a mobile device display. The advertising corner control interface area includes a graphic with content. When the mobile device is in a first (portrait) rotational orientation in a plane perpendicular the Earth's surface, the advertising corner control interface area occupies a fixed area on the display. The advertising corner control interface area is selectable to cause the display of a second user interface that comprises an advertising interface area that includes an advertisement with content corresponding to the content of the graphic. When the mobile device is rotated into a second (landscape) rotational orientation in the plane perpendicular to the Earth's surface, the advertising corner control interface area occupies the fixed area on the display. The method also comprises selecting the advertising corner control interface area to display the second user interface.

Referring to FIG. 1, a mobile device 40 is depicted in a first rotational orientation within a plane perpendicular to the Earth's surface. In the figure, the plane is illustrated as the x-y plane, where the y-axis extends vertically upward from the Earth's surface. Mobile device 40 is preferably a smart device that includes memory, a memory controller, one or more processing units (CPUs), RF circuitry, audio circuitry, a speaker, a microphone, an input output subsystem, and ports for connecting peripheral devices. Mobile device 40 includes a housing 42 and a display 44 that is capable of displaying text, images, movies, videos, icons, animations, and other visual output (collectively, "graphics") to a user. The memory may include high-speed random access memory and may also include non-volatile memory, such as one or more magnetic disk storage devices, flash memory devices, or other non-volatile solid-state memory devices. Access to the memory by other components of device 40, such as a CPU and/or a peripherals interface may be controlled by a memory controller.

Display 44 is also configured to receive user inputs via selection techniques such as touching, sliding, swiping, pressing, and other physical interactions with targeted areas of display 44. Display 44 may use LCD (liquid crystal display) technology, LPD (light emitting polymer display) technology, or LED (light emitting diode) technology, although other display technologies may be used in other embodiments. Display 44 and a display controller (not shown) may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display 44. In an exemplary embodiment, projected mutual capacitance sensing technology is used, such as that found in the iPhone® from Apple Inc. of Cupertino, Calif.

Mobile device 40 may also include one or more accelerometers (not shown). In some embodiments, information is displayed on the display 44 in a portrait view or a landscape view based on an analysis of data received from the one or more accelerometers. Mobile device 40 optionally includes, in addition to accelerometer(s) a magnetometer and a GPS (or GLONASS or other global navigation system) receiver for obtaining information concerning the location and orientation (e.g., portrait or landscape) of mobile device 40.

In some embodiments, the memory of mobile device 40 stores one or more of an operating system, a communication module (or set of instructions), a contact/motion module (or set of instructions), a graphics module (or set of instructions), a text input module (or set of instructions), a Global Positioning System (GPS) module (or set of instructions), and applications (or sets of instructions). Suitable exemplary operating systems include the iOS operating system provided by Apple, Inc., the Android operating system provided by Google, Inc. of Mountain View, Calif., the Windows Phone Systems provided by Microsoft Corporation of Redmond, Wash., the WebOS operating system supplied by Hewlett-Packard of Sunnyvale, Calif., Blackberry OS supplied by Blackberry, Ltd. of Waterloo, Canada, and Firefox OS, provided by Mozilla of Mountain View, Calif.

Mobile device 40 may also include a contact/motion module for detecting contact with display 44 (in conjunction with a display controller). The contact/motion module includes various software components for performing various operations related to detection of contact, such as determining if contact has occurred (e.g., detecting a finger-down event), determining if there is movement of the contact and tracking the movement across the display 44 (e.g., detecting one or more finger-dragging events), and determining if the contact has ceased (e.g., detecting a finger-up event or a break in contact). The contact/motion module receives contact data from the display 44. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The contact/motion module may detect a gesture input by a user. Different gestures on display 44 have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the display 44 includes detecting a finger-down event followed by detecting one or more finger-dragging events, and subsequently followed by detecting a finger-up (lift off) event.

Mobile device 40 may also include a graphics module that includes various known software components for rendering and displaying graphics on display 44, including components for changing the intensity of graphics that are displayed. As used herein, the term "graphics" includes any object that can be displayed to a user, including without limitation text, web pages, icons (such as user-interface objects including soft keys), digital images, videos, animations, etc. Mobile device 40 may also include a keyboard with "hard keys" used to effect operations on mobile device 40.

The present disclosure is directed to techniques for providing users of applications with advertising. The described techniques are not limited to any particular applications. Examples of possible applications may include applications for providing contacts (e.g., in an address book or contacts list), a telephone dialer interface, video conferencing, e-mail, instant messaging, photographs, videos, music, a web browser, weather information, stock information, and maps, to name but a few possibilities. Users perform operations on mobile device 40 by using controls configured within a user interface provided on display 44. The controls comprise areas of the display 44 that are selectable using particular selection techniques (i.e., a finger swipe, a press, a finger pinch, etc.) to effect desired operations. The user interface may also include graphics. For example, a telephone dialer application may be configured so that selected areas of the display 44 include images of numbers which may be selected to dial (or input) the displayed number for use in placing a call. Thus, the user interface provides controls and graphics to the user. Graphics may be associated with controls or may be displayed without any associated control, depending on the nature of the particular application. Controls may also be provided on particular areas of the display 44 without a graphic or with a graphic that fully or partially overlaps the selectable area associated with the control. As used herein, the term "user interface" refers to a unique arrangement of any, some, or all of an advertising control interface area, an application interface area, an advertising interface area or other interface areas that may be displayed on display 44 at a particular point in time. Thus, FIG. 1 depicts a first user interface, FIG. 2 depicts a second user interface, and FIG. 3 depicts a third user interface.

The user interfaces depicted in FIGS. 1-3 are preferably defined by composites of one or more user interface "views" or "layers." Each view or layer is a configuration of graphics and controls (as well as their layout or spatial arrangement) within display 44. Modern smart device operating systems typically allow for the creation of "view" classes and sub-classes that can be instantiated as corresponding view objects and sub-objects. Each user interface view may be configured to define certain graphics and/or controls that occupy distinct portions or all of display 44, a well as the spatial arrangement of the graphics and/or controls on display 44.

Different views and view objects may be related to one another as "parent" and "child." The term "parent view" is a relative term, as any given view may be the child of one view and the parent of another. However, in general, a child view object is wrapped in (or contained in) a parent view object. For example, the Android operating system provides a class called "View" that is used to create widgets (buttons, text fields, etc.). The View class is a parent to a "ViewGroup" subclass that defines individual layouts using the defined widgets. The ViewGroup acts as an invisible container that holds other views or other ViewGroups and defines their layout properties. This type of architecture allows multiple interface functionalities to be defined in a single view object that can then be referenced by other computer executable instructions. In accordance with certain examples, the advertising corner control interface area 52 and the application interface area 46 are both defined by respective view objects that are wrapped or contained in a parent view object.

As is known in the art, certain modern smart device operating systems also allow for the creation of several interface views with a layered architecture. Thus, although it is not physically measurable, there is a depth dimension associated with each of the views. Different techniques are used to achieve a layered architecture. One technique uses a "stack" in which views are positioned one on top of the other. Another technique assigns a z-axis position to the various views. Each interface view provides controls and graphics in an x-y plane and may be related to other interface views along the depth dimension. This type of layered architecture allows interface developers to create user interfaces by selectively bringing different interfaces to the foreground relative to one another. Multiple views may also be displayed at a given time such that the interface area(s) generated by one view will occupy a first portion of the display 44 while an interface area generated by another view will occupy a second portion of the display 44.

Multiple views may also be generated at a given time in an overlapping relationship where a first view obscures the other view on display 44 because of the relationship of their depth dimensions.

Referring again to FIG. 1, mobile device 40 includes a display 44 displaying a first user interface that comprises an advertising corner control interface area 52 and an application interface area 46. In the illustrated example, the application interface area 46 does not occupy the entire display 44. However, in certain preferred examples, the application interface area 46 extends along the entire length and width of display 44. The advertising corner control interface area 52 is a user-selectable area that may be used to trigger one or more pre-defined operations. The advertising corner control interface area 52 includes a graphic 54 having content. In this case, the graphic is the small Greek letter "delta" (δ) overlaid on a square box. The "delta" text is associated with advertising content that the user can access by selecting the advertising corner control interface area 52. In certain examples, the advertising corner control interface area 52 may include a selectable area that is less than the interface area 52 and/or different from the area of display 44 occupied by graphic 54. However, in the illustrated example of FIG. 1, the graphic 54 covers the entire advertising corner control interface area 52, and the entire advertising corner control interface area 52 is selectable by a user to cause the display of a second user interface. One example of such a second user interface is provided in FIG. 4. FIG. 4 depicts a second user interface comprising an advertising interface area 50 on display 44. The advertising interface area 50 includes an advertisement 51 having advertising content related to the content of the graphic 54 in the advertising corner control interface area 52 of the first user interface (FIG. 1). As shown in FIG. 4, the advertising interface area 50 does not occupy the entire area of display 44. However, in other examples it may. The application interface area 46 includes application interface content 48, which may comprise controls and/or graphics. In certain examples, the application interface content 48 is scrollable relative to an application interface reference location 43 within application interface area 46.

In preferred examples, the area of display 44 occupied by advertising interface area 50 is greater than the area of display 44 occupied by advertising corner control interface area 52 and its associated graphic 54. The ratio of the area of display 44 occupied by the advertising interface area 50 to the area of display 44 occupied by advertising corner control interface area 52 is preferably at least about seven, more preferably at least about ten, and still more preferably at least about twenty. In the same or other examples, the ratio is preferably no more than about 50, more preferably no more than about 65, and still more preferably no more than about 100.

Figure 5:
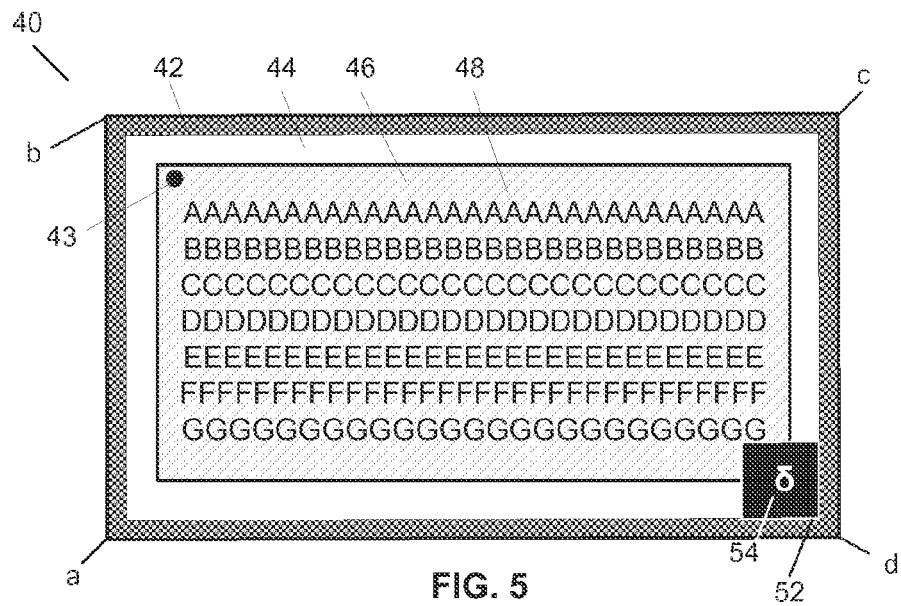
FIG. 5 is a front elevational view of the mobile device of FIG. 1 in a second (landscape) rotational orientation in the plane perpendicular to Earth's surface, with the mobile device in the first operative state displaying the first user interface wherein the application interface content is in a first position relative to a reference point in the application interface area.

In the example of FIG. 4, the second user interface does not include either the advertising corner control interface area 52 or the application interface area 46. In certain examples, the advertising interface area 50 may be selectable to take the user to a website where the advertised goods and services can be purchased. In FIG. 5, a link to www.123.com/apps is provided so the user can purchase applications supplied under the δ trademark.

The advertising corner control interface area 52 provides an indication to the user that the application displayed in application interface area 46 is linked to an advertisement that the user can access by selecting the advertising corner control interface area 52 (or its graphic 54). In the example of FIG. 4, the second user interface does not include the advertising corner control interface area 52. However, it may include an alternative control that the user can select to remove the advertisement 51 and return to the first user interface of FIG. 1.

Certain known mobile devices include accelerometers that are used to determine when the mobile device 40 has been rotated by a specified degree of rotation in a plane (e.g., the x-y plane shown FIGS. 1-6) that is perpendicular to the Earth's surface, or put differently, rotated about an axis that is perpendicular to the display 44 and parallel to the Earth's surface. The accelerometer is used to determine the rotational orientation of the mobile device 40 in the plane perpendicular to the Earth's surface and to re-orient the application interface area content 48 so that the upper-left hand corner reference point 43 of the application interface area remains in the upper-left hand corner position when the mobile device 40 is in either the portrait orientation of FIG. 1 or the landscape orientation of FIG. 5. Thus, when viewed by a user standing on or seated upright relative to the Earth's surface, application interface area reference point 43 preferably remains in the uppermost and left-most corner relative to the other corners of the display 44 when mobile device 40 is rotated from a portrait to landscape orientation (or vice-versa) in a plane perpendicular to the Earth's surface even if the mobile device 40 is configured to rotate the application interface area 46 and its content 48 relative to a fixed reference point on the mobile device 40 (e.g., one of the corners a-d) in response to the rotation. The term "portrait rotational orientation" refers to an orientation in which the shortest (width) dimension of display 44 is parallel to the Earth's surface, and the term "landscape rotational orientation" refers to an orientation in which the longest (length) dimension of display 44 is parallel to the Earth's surface. In the case of displays that are square, the terms "portrait" and "landscape" simply refer to rotational orientations that are ninety degrees apart from one another and in which a side of the mobile device 40 is parallel to the Earth's surface.

In FIG. 1, mobile device 40 is in a portrait rotational orientation relative to the Earth's surface such that corner a is spaced apart in the positive vertical (y-axis) direction from corner d and corner b is spaced apart from corner c in the positive vertical (y-axis) direction. Corner a is spaced apart from corner b in the negative horizontal (x-axis) direction that is parallel to the Earth's surface, and corner d is spaced apart from corner c in the same direction. Referring to FIG. 5, mobile device 40 is rotated counterclockwise relative to FIG. 1 into a landscape rotational orientation in which corner c is spaced apart from corner d in the positive vertical (y-axis) direction, and corner b is spaced apart from corner a in the same direction. Corner c is spaced apart from corner b in the positive horizontal (x-axis) direction, and corner d is spaced apart from corner a in the same direction. However, in both the first (portrait) rotational orientation of FIG. 1 and the second (landscape) rotational orientation of FIG. 5, the application interface area reference point 43 is spaced apart from the advertising corner control interface area 52 in the positive vertical (y-axis) direction and the negative horizontal (x-axis) direction. In FIG. 1, the application interface area reference point 43 is spaced apart from the advertising corner control interface area 52 in the positive vertical (y-axis) direction along the length dimension of the mobile device 40, whereas in FIG. 5 the application interface area reference point 43 is spaced apart from the advertising corner control interface area 52 in the positive vertical (y-axis) direction along the width dimension of the mobile device 40. This relationship between the application interface area reference point 43 and the advertising corner control interface area 52 ensures that when the viewer is looking at display 44 such that display 44 is in a plane perpendicular to the Earth's surface, the advertising corner control interface area 52 always appears in the same location on the display, which in this particular example, is the bottom right hand corner. Thus, in the first (portrait) rotational orientation of FIG. 1, advertising corner control interface area 52 is proximate corner c, and in the second (landscape) rotational orientation of FIG. 5, advertising corner control interface area 52 is proximate corner d. If mobile device 40 is rotated another 180 degrees clockwise (from its rotational orientation in FIG. 5), the advertising corner control interface area will be located in corner b.

As mentioned previously, in many known advertising techniques, a user interface is provided which includes a banner ad area and an application interface area. The banner ad is typically rectangular in shape and provided vertically beneath the application interface area. In many of these known techniques, the banner ad area is re-sized and rotated when the mobile device is rotated from the first (portrait) rotational orientation of FIG. 1 to the second (landscape) rotational orientation of FIG. 5. However, such techniques are inefficient because in the second (landscape) rotational orientation of FIG. 5, the banner ad often consumes more area on the display 44 than is necessary to allow the user to launch advertising interface area 50 (FIG. 4). Thus, in certain preferred examples herein, the advertising corner control interface area 52 occupies the same fixed area on display 44 when mobile device 40 is in the first (portrait) rotational orientation of FIG. 1 and the second (landscape) rotational orientation of FIG. 5. The percentage of the total display 44 area occupied by the advertising corner control interface area 52 is preferably no less than one percent and more preferably no less than two percent. At the same time or in other examples, the percentage of the total display 44 area occupied by the advertising corner control interface area 52 is preferably no more than about twenty percent and more preferably no more than about fifteen percent. In one example, the advertising corner control interface area 52 occupies an area of the display 44 that is measured in pixels, and the pixel dimensions of the advertising corner control interface area 52 remain fixed when the mobile device 40 is rotated from the first (portrait) rotational orientation of FIG. 1 to the second (landscape) rotational orientation of FIG. 5 or vice-versa. In one example, the advertising corner control interface area is 125×125 pixels.

Figure 6:
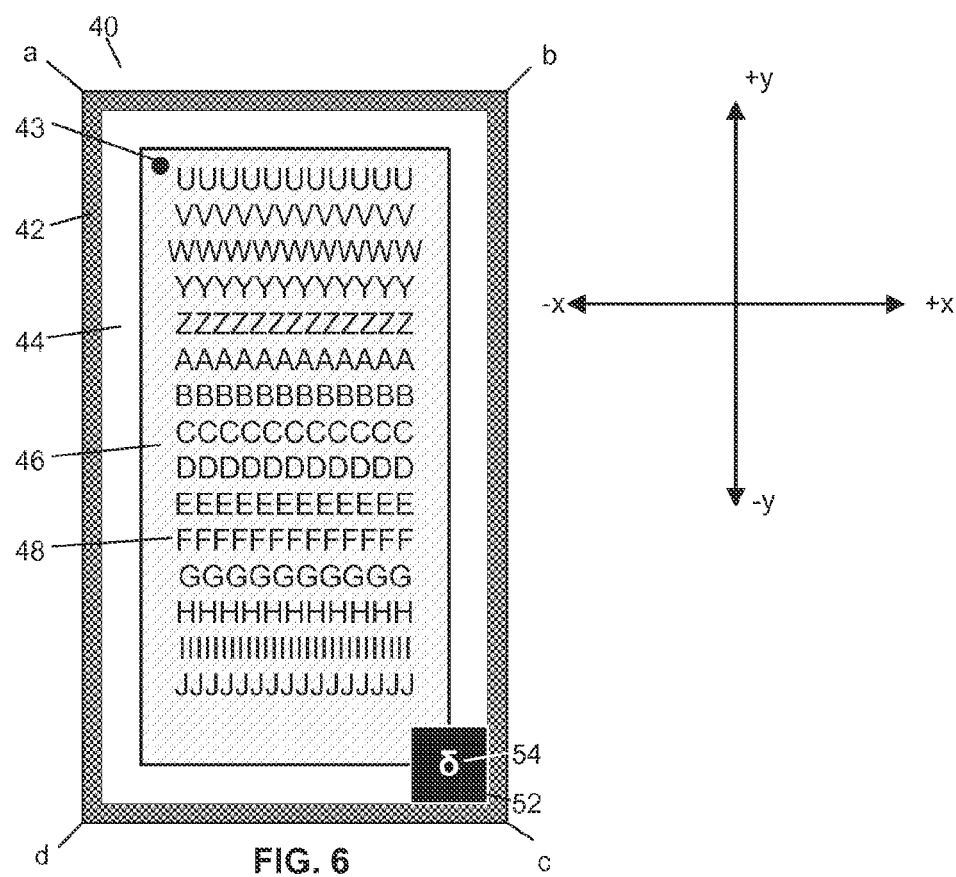
FIG. 6 is a front elevational view of the mobile device of FIG. 1 in the first (portrait) rotational orientation and the first operative state displaying the first user interface wherein the application interface content is in a second position relative to the reference point in the application interface area.

As shown in FIGS. 1 and 6, advertising corner control interface area 52 is preferably provided with "scroll-away" protection. In certain known mobile devices, application content may be scrolled along the length and/or width directions of mobile device 40. In FIG. 1, the application interface area content 48 is shown in a first configuration relative to application interface area reference point 43. After being scrolled along the length direction of mobile device 40, the application interface area content 48 appears in a second configuration relative to application interface area reference point 43, as shown in FIG. 6. The top row of A's in FIG. 1 is scrolled down (in the negative vertical (y) axis direction) and away from application interface area reference point 43 in FIG. 6. In many known advertising solutions, this type of scrolling operation would cause the advertising corner control interface area 52 to disappear from display 44. However, in preferred examples herein, when a user scrolls application interface area content 48 relative to application interface area reference point 43 (while maintaining mobile device 40 in a fixed rotational orientation within a plane perpendicular to the Earth's surface), the location of advertising corner control interface area 52 remains fixed relative to the application interface area reference point 43.

Referring now to FIGS. 1, 3, and 5, a method of accessing advertising on mobile device 40 will now be described. In accordance with the method, a user may select advertising corner control interface area 52 using multiple selection techniques to effect multiple operations, each of which uniquely corresponds to one of the selection techniques. In one example, the user may select advertising corner control interface area 52 using a first selection technique to display advertising interface area 50 (FIG. 4) and using a second selection technique to dismiss or remove the advertising corner control interface area 52 (FIG. 3). Thus, this exemplary method allows users to "opt-out" of having advertisements displayed while using selected applications. In preferred examples, the entire portion of display area 44 occupied by graphic 54 is selectable. In the same or other preferred examples, the same area on display 44 is selectable using both the first and selection techniques to effect the operations to which the techniques respectively correspond. In other examples, the user may use a third selection technique to retain the advertising corner control interface area 52 but to change the graphic 54 and/or its content as well as the advertisement 51 in advertising interface area 50 to which the graphic content is related. In additional examples, the user may use the particular selection technique to bring up a menu with options for changing the graphic 54 content or dismissing the advertising corner control interface area 52 altogether. In further examples, a selection technique may be used that causes the advertising corner control interface area 52 and/or graphic 54 to temporarily disappear with a new advertising corner control interface area 52 and/or graphic 54 subsequently being displayed to the user.

The first and second selection techniques (or any other selection techniques) preferably comprise unique actions taken with respect to display 44. In one example, briefly contacting (or "clicking") on advertising corner control interface area 52 will launch the second user interface of FIG. 4, while longer contact on advertising corner control interface area 52 will remove the advertising corner control interface area 52 from display 44 (FIG. 3). In another example, the first selection technique may comprise a single contact with advertising corner control interface area 52, and the second selection technique may comprise multiple contacts with advertising corner control interface area 52. In yet another example, the first selection technique may comprise one or more brief contacts with the advertising corner control interface area 52, and the second selection technique may comprise a brief contact followed by a long contact (i.e., a "tap and hold" technique).

An alternate selection technique is illustrated in FIG. 2. In accordance with this technique, the advertising corner control interface area 52 is selectable to provide a set of control options, including a menu 58 with a link 60 for generating the second user interface of FIG. 4 and a link 58 for dismissing or removing the advertising corner control interface area 52 to yield the third user interface of FIG. 3. In certain examples, menu 58 may include a third link for dismissing the particular graphic 54 in advertising corner control area 52 and receiving new content (that is linked to a corresponding advertisement 51 in advertisement interface area 50). In certain preferred examples, the entire advertising corner control interface area 52 is selectable to cause the display of menu 58.

In certain examples, the graphic 54 and/or its content (e.g., the small letter "delta") in the advertising corner control interface area 52 (FIG. 1) is dynamically updated, as is the advertisement 51 on second user interface of FIG. 4. For example, mobile device 40 may be operatively connected to a server over a local area network, wide area network, or the internet, and the particular graphic 54 (or its content) and advertisement 51 may be retrieved from the server dynamically. For example, GPS coordinates or information regarding user preferences may be used to dynamically determine which advertising information to provide in advertising corner control graphic 54 and advertisement 51.

In certain examples, the user interfaces shown in FIGS. 1-6 are defined by compositing multiple user interface views (layers). Referring to FIG. 1, in one example advertising corner control interface area 52 is defined by an advertising corner control interface view, and application interface area 46 is defined by an application user interface view on which the advertising corner control interface view is overlaid. The views may define controls and graphics that extend across the entirety of a parent view to which they belong or a portion thereof. However, in FIG. 1 the advertising control interface view defines an advertising corner control interface area 52 that does not extend beyond the graphic 54 depicted in the figure. Therefore, the advertising corner control interface view can be overlaid on the application user interface view without obscuring much or any of the application interface area 46 or its application interface area content 48. The two views are displayed simultaneously in an overlapping relationship. However, the advertising corner control interface view does not define controls or graphics outside of the advertising interface corner control area 52. Thus when the views are displayed simultaneously, most or all of the application interface area 46 is visible.

In certain examples, the second user interface of FIG. 4 is defined by an advertising interface view that defines advertising interface area 50. In some embodiments, the application user interface view may initially be overlaid on top of the advertising interface view so that the application interface area 46 obscures the advertising 51. In other embodiments involving operating systems that associate interface layers with z-axis coordinates, the advertising interface view used to generate advertising interface area 50 is generated before it is displayed (i.e., the code used to create the advertising interface view is executed before the advertising interface area 50 is displayed) and assigned a z-axis coordinate that is beneath that of the application interface view and the advertising corner control view when the first user interface of FIG. 1 is displayed. When the second user interface of FIG. 4 is displayed, the z-axis coordinate of the advertising interface view is altered so that it is displayed and the application interface view and advertising corner control views are obscured. In other embodiments that involve operating systems that provide "stacked" layers, the advertising interface view is generated before it is displayed and pushed to a higher (foreground) stack position when the second user interface of FIG. 4 is displayed, and the application interface view and/or advertising corner control interface view is pushed to a lower (background) position when the second user interface of FIG. 4 is displayed. In other examples, the advertising interface view is not provided in a stacked arrangement. Instead, when a user selects the advertising corner control interface area 52 with a first selection technique, the advertising interface view is generated at that point in time such that it overlays the application interface view and the advertising corner control view.

User interfaces that include distinct areas such as the advertising corner control interface area 52 and the application interface area 46 may be defined in and generated by a single interface view object created by the application developer. However, in that case each developer would have to separately provide code to generate the advertising corner control interface view that defines the advertising corner control interface area 52, as well as the code for generating the advertising interface view that defines the advertising interface area 50. In accordance with one example, the advertising corner control interface view is provided as part of a software development kit. As is known in the art, a software development kit, or SDK, is typically a set of software development tools that allows for the creation of applications for a certain software package, software framework, hardware platform, computer system, video game console, operating system, or similar development platform. In accordance with another aspect of the present disclosure, a software development kit is provided which comprises a computer readable medium having a set of computer executable instructions stored on it. When executed by a computer processor, the instructions generate a first user interface view (e.g., an advertising corner control interface view) that includes advertising corner control interface area 52, which functions as described previously. In certain examples, advertising corner control interface area 52 is part of an advertising corner control interface view that overlays a portion of a second user interface view (e.g., an advertising interface view that includes advertising interface area 50 in FIG. 4). In additional examples, the computer executable instructions in the SDK themselves are used to generate the advertising interface view that defines advertising interface area 50. In other examples, code that is separate from the SDK is used to provide the advertising interface view.

The advertising corner control interface area 52 is selectable to cause a second user interface view which includes advertising interface area 50 (FIG. 4) to be visible. In certain examples, when executed by a computer processor, the computer executable instructions in the SDK further cause the advertising corner control interface area 52 to be removed from the user interface when the advertising corner control interface area 52 is selected, as illustrated in FIG. 4. In the same or other examples, when executed by a computer processor, the computer executable instructions in the SDK also generate the second user interface view in addition to making it visible. In further examples, and as illustrated in FIG. 3, the advertising corner control interface area 52 is selectable to make the advertising corner control interface area 52 disappear without displaying the advertising interface area 50.

server. The content may be dynamically identified and transmitted to mobile device 40 based on any number of dynamically varying conditions, including, the subject matter of the application interface content 48, the time of day, day of the week, month or season, user preferences, etc. The computer executable instructions may also retrieve advertising content 51 (FIG. 4) that corresponds to the graphic content in graphic 54 (FIG. 1) from the same or a different server.

As mentioned previously, an SDK of the type described herein allows multiple application developers to easily install a uniform advertising solution that can be used to generate the user interfaces of FIGS. 1-6. In one example, the SDK comprises a parent view object that is wrapped around (or contains) the application corner control interface view object (that defines advertising corner control interface area 52 in FIG. 1), and in some examples, an advertising interface view object (that defines advertising interface area 50 in FIG. 4). In certain examples, the parent view object may be a view object provided by an operating system (e.g., an instantiation of the ViewGroup class for Android operating systems), and in other examples, the parent view object may be an instantiation of a subclass that is part of a larger operating system class (i.e., a class that is defined by the operating system).

Figure 7:
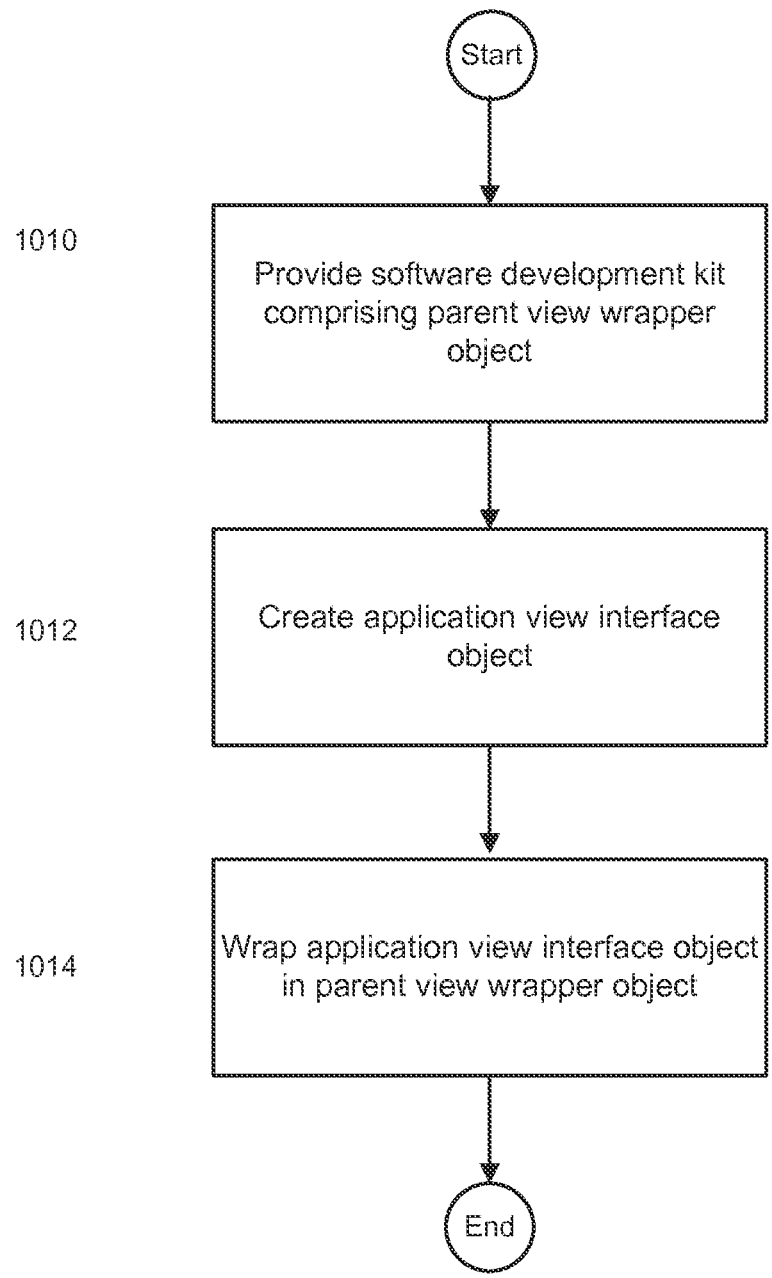
FIG. 7 is a flow chart depicting a method of providing an application with a dynamic advertisement interface.

Referring to FIG. 7, a method of providing an application user interface with a dynamic advertising feature is provided. In accordance with the method, in step 1010 an SDK of the type just described is provided. In step 1012, an application developer creates the code necessary to generate an application interface view that includes and defines the application interface area 46 shown in FIGS. 1-3 and 5-6. The application interface view is provided as an object that the application developer wraps (step 1014) in the parent view object provided in the SDK (or in some implementations, in a parent view object provided by the operating system). Several techniques may be used to perform this wrapping operation. In accordance with one technique, the application developer may simply write the code to instantiate an application interface view object and write the code to wrap the application interface view object in the SDK's parent view object. For example, if the parent view object is called PascharUIFrameLayout and the application interface view object is called UserLayout, code such as the following may be used:

```
PascharUIFrameLayout parentlayout = new PascharUIFrameLayout(this);
this.addContentView(parentlayout, new
FrameLayout.LayoutParams(FrameLayout.LayoutParams.MATCH_PARENT
, FrameLayout.LayoutParams.MATCH_PARENT));
parentlayout.add([UserLayout]).
```

In further implementations, the advertising corner control interface view provided in the SDK includes an advertising corner control interface area 52 that occupies an area on display 44 which remains fixed as mobile device 40 is rotated from the first (portrait) rotational orientation of FIG. 1 to the second (landscape) rotational orientation of FIG. 5. As mentioned previously, the rotational orientations are preferably defined in a plane (shown as the x-y plane in the figures) that is perpendicular to the Earth's surface. The graphic 54 provided in the advertising corner control interface view occupies the amount of display area described previously. In certain examples, the computer executable instructions included in the SDK provide scroll-away protection of the type described previously with respect to FIGS. 1 and 6.

In further examples, the computer executable instructions provided as part of the SDK also retrieve graphic content for advertising corner control interface area 52 from a remote In accordance with another example, applicable to Android operating systems, the application developer may use xml (extensible mark-up language) to perform the wrapping operation. For example, if the SDK includes a parent view object called PascharUIFrameLayout and the developer creates an application interface view object called UserLayout, the latter object may be wrapped in the former object using the following code:

```
<PascharUIFrameLayout>
    <UserLayout/>
<PascharUIFrameLayout>
```

In another example involving iOS and Windows operating systems, a visual editor is provided that allows a developer to build an interface by dragging interface objects onto a window or menu. In this case, a parent view object (e.g., PascharUIFrameLayout) can be dragged and dropped into the window or menu, and the application interface view object (e.g., UserLayout) can be dragged and dropped into the parent view object.

Once the SDK's parent view is wrapped around the application interface view object and the advertisement corner control interface view object (and converted into machine readable format), the net result is that a set of computer executable instructions are provided on a computer readable medium in mobile device 40 which, when executed by a computer processor perform the step of generating the advertising corner control interface view that includes advertising corner control interface area 52 and graphic 54 on display 44 (FIG. 1). The advertising corner control interface view overlays the application interface view (such as by adjusting the relative stack positions of the views in those operating systems that support the use of stack techniques or z-axis positions for those operating systems that provide z-axis parameters for interface views) which also appears on display 44. When the user selects the advertising corner control interface area 52 using a first selection technique, the advertising corner control interface area 52 and the application interface area 46 disappear from display 44 to display advertising interface area 50 and its advertisement 51 (FIG. 4). When the user selects the advertising corner control interface area 52 using a second selection technique, the advertising corner control interface area 52 is removed from the display 44 (FIG. 3). Specific selection techniques may also be used to retain the advertising corner control interface area 52 but change the graphic 54 or its content (and the related advertisement 51) or to temporarily dismiss the advertising corner control interface area 52 (or its graphic 54) prior to receiving a new advertising corner control interface area 52 (or graphic 54) with different content. In certain examples, the area of display 44 that is selectable using both the first and second selection techniques is the same. In some examples, the set of computer executable instructions also performs the step of generating the advertising interface view and generating the application interface view. The computer executable instructions may further retrieve graphic content for graphic 54 and/or advertising content for advertisement 51 which is related to the content of graphic 54.

In certain examples of software development kits in accordance with the present disclosure, when the mobile device 40 is rotated in a plane perpendicular to the Earth's surface (e.g., the x-y plane in the figures) from a portrait rotational orientation to a landscape rotational orientation (or vice-versa), the area of display 44 occupied by the graphic 54 remains fixed. The percentage of the total display 44 area occupied by the advertising corner control interface area 52 is preferably no less than one percent and more preferably no less than two percent. At the same time or in other examples, the percentage of the total display 44 area occupied by the advertising corner control interface area 52 is preferably no more than about twenty percent and more preferably no more than about fifteen percent. In one example, the advertising corner control interface area 52 occupies an area of the display 44 that is measured in pixels, and the pixel dimension of the advertising corner control interface area 52 remains fixed when the mobile device 40 is rotated in a plane perpendicular to the Earth's surface from a first rotational orientation to a second rotational orientation of FIG. 5 or vice-versa. In one example, the advertising corner control interface area is 125×125 pixels. In the same or other examples, when a user scrolls application content relative to an application interface area reference point (e.g., reference point 43), the location of the graphic on display 44 and relative to the application interface area reference point remains fixed.

Figure 8:
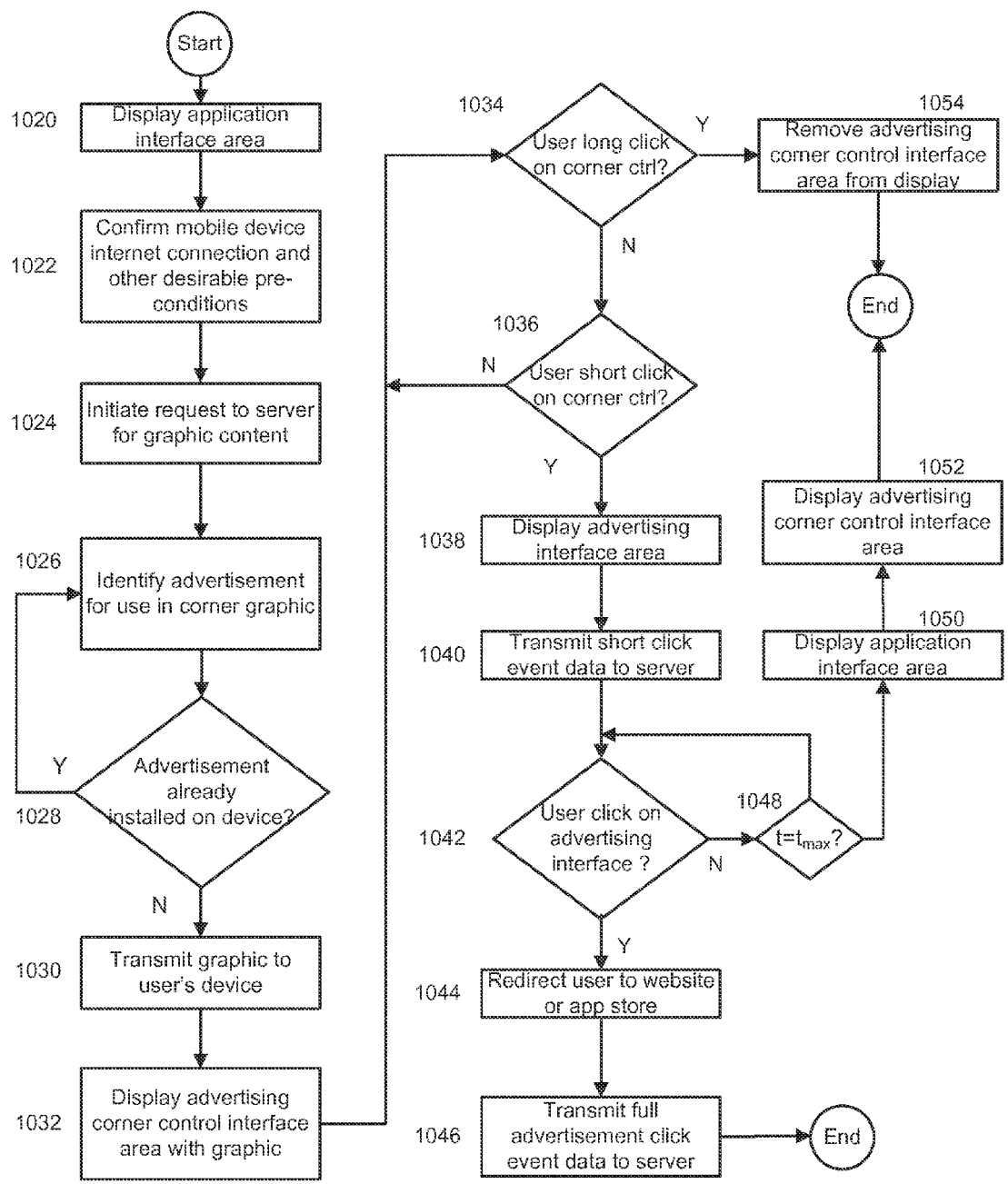
FIG. 8 is a flow chart depicting a method of providing advertising to a mobile device user on a mobile device display.

Referring to FIG. 8, a method of providing advertising to a mobile device user is described. In accordance with the method, a set of computer executable instructions stored in memory on the mobile device 40 are executed by a processor to display application interface area 46 on display 44 (step 1020). The instructions then confirm that mobile device 40 has an internet connection and conduct any other checks of required pre-conditions (step 1022), such as confirming the type of internet connection, the phone screen size, the current location, whether the developer's API key is present, the carrier, the connection speed (e.g., 3G, 4G, LTE, etc.), whether the advertisement is a test advertisement, whether the mobile device has near field communication (NFC), and whether the device 40 is Bluetooth-enabled, etc. In step 1024, mobile device 40 transmits a request to a remote server for the graphic 54 to display on display 44. In step 1026, the remote server identifies an advertisement and the content to be used in graphic 54 that is related to the advertisement. Information identifying the content of the advertisement is then sent to mobile device 40.

In step 1028, the computer executable instructions stored on mobile device 40 determine whether the advertisement identified in step 1026 is already stored on mobile device 40. If it is, control returns to step 1026 so that another advertisement can be identified and transmitted to mobile device 40. If the advertisement is not already present on mobile device 40, control proceeds to step 1030 and the graphic 54 and the full advertisement 51 are transmitted to the mobile device 40. In certain examples, the server will transmit additional data related to the advertising such as a data field indicating the type of data comprising the graphic 54 or the advertisement 51 (e.g., images, rich media, interactive media, or test data). Rich media and html content may also be transmitted to mobile device 40.

In step 1032 advertising corner control interface area 52 is displayed on display 44. The advertising corner control interface area 52 is preferably displayed as part of an advertising corner control interface view that overlays an application interface view that defines application interface area 46. At this point, the user can (1) use the application while the advertising corner control interface area 52 remains displayed, (2) dismiss the advertising corner control interface area 52 so it is removed from display 44 (FIG. 3), or (3) display the advertising interface area 50 (FIG. 4). In step 1034 the computer executable instructions determine if the user has selected the advertising corner control interface area 52 using a first selection technique, such as a long click. If the first selection technique has been used, control transfers to step 1054 and the advertising corner control interface area 52 is removed from mobile device display 44. In other embodiments, options may be provided to retain the advertising corner control interface area 52 and receive a new graphic 54 or graphic content or to temporarily dismiss the advertising corner control interface area 52 (or graphic 54) and then re-display it once new graphic content is received.

If in step 1034 the user has not used the first selection technique, control transfers to step 1036, and the computer executable process instructions determine whether the user has selected the advertising corner control interface area 52 using a second selection technique, such as a short click. If the second selection technique has not been used, control returns to step 1034 and the instructions again determine whether the first selection technique has been used. Otherwise, control transfers to step 1036, and the advertising interface area 50 (FIG. 4) is displayed (step 1038). In step 1036 the application interface area 46 and advertising corner control interface area 52 are preferably removed from display 44 as shown in FIG. 4.

In certain examples, it is desirable to keep a record of user selections of the advertising corner control interface area 52 using the second selection technique (i.e., when the user makes a selection to launch advertising interface area 50 and its advertisement 51). In certain embodiments, advertisers are charged when users use the second selection technique. In such embodiments, event data indicating the use of the second selection technique is transmitted to the remote server for recording and subsequent use in billing advertisers (step 1040).

Once the user has displayed the advertising interface area 50, the instructions determine if the user has selected the advertising interface area 50, such as by using the first or second selection techniques or a different selection technique (step 1042). If the user has selected the advertising interface area 50, in step 1044 he may be redirected to a website or application store so that he may purchase the goods or services that are the subject of advertisement 51 (FIG. 4). In certain examples, advertisers may be billed when a user selects advertising interface area 50 (FIG. 4). In such cases, it may be desirable to transmit event data indicating that the user has selected the advertising interface area 50 to a remote server for recording and subsequent use in billing advertisers (step 1046).

In one implementation, a full unit advertising charge is determined, and when the user selects the advertising corner control interface area using the first selection technique (step 1036), the advertiser is assessed a fraction of the full unit advertising charge. If the user then selects the advertising interface area 50 in step 1042 (indicating yet further interest in the advertised subject matter), the full unit advertising charge is assessed. Thus, in one example, following step 1040 the advertiser is assessed a charge that is at least 10%, preferably at least 20% and more preferably at least 30% of the full unit advertising charge. At the same time the assessed advertising charge is preferably no greater than 60%, more preferably no greater than 40%, and more preferably no greater than about 35% of the full advertising charge. In the same or other examples, when the user selects the advertising interface area 50 in step 1042, the advertiser is assessed 100% of the full unit advertising charge. Thus, the disclosed method allows application publishers to charge advertisers different rates based on the extent to which users show interest in their advertising. In this case, the selection of advertising corner control interface area 52 and advertising interface area 50 are used as proxies for or indicators of the user's interest in the advertised subject matter.

Without wishing to be bound by any theory, it is believed that the use of the advertising corner control interface area 52 described herein is less likely to result in inadvertent or unintentional selection of the advertising corner control interface area which improves its accuracy as a proxy for user interest in the subject matter of the advertising to which the content in graphic 54 relates. In particular, by providing an advertising corner control interface area 52 that is selectable using multiple selection techniques, the same overall display area may be selectable for launching the advertising interface area 50 (FIG. 4), dismissing the advertising corner control interface area 52 (FIG. 3), or changing the content of graphic 54 (and/or the graphic 54 itself) as well as the advertisement 51 linked to it. Thus, in contrast to certain known banner ad techniques, the selectable area for dismissing the advertising corner control interface area 52 need not be less than the selectable area for launching the advertising interface area 50, which as explained previously, can cause users to mistakenly launch an advertisement instead of dismissing the banner ad.

If the advertising interface area 50 is displayed (step 1038) and the user has not selected the advertising interface area 50 (step 1040), in step 1042 control transfers to step 1048 and a timer is used to compare a current time value t elapsed since the advertising interface area 50 was first displayed. If the time value t exceeds a maximum time value $t_{max}$, the application interface area 46 is again displayed on display 44 (Step 1050). In step 1052, the advertising corner control interface area 52 is again displayed on display 44. Steps 1042, 1048, and 1050 ensure that the user is able to again access the application interface area 46 if he is not interested in advertisement 51, as indicated by his failure to select advertising interface area 50 prior to the timer expiring (step 1048). In certain examples the graphic 54 displayed as part of the advertising corner control interface area 52 in step 1052 may include content that relates to a new advertisement (i.e., one that is different from the advertisement 51 that was most recently displayed on display 44). In such examples, the user is sequentially presented with different graphics 54 with which he may interact to generate corresponding advertisements 51 if desired. As explained previously, if the user does not wish to interact with or be provided any advertisements, he may simply use the first selection technique to select the advertising corner control interface area 52 in step 1034 to remove the advertising corner control interface from display 44.

In certain examples, advertisers wishing to advertise on applications that use the advertising techniques described herein will undergo a subscription process, preferably with the provider of the above-described software development kit (SDK). The process comprises signing up for an account, providing content for the graphic 54 (e.g., the small letter "delta", δ, shown in graphic 54) and the advertisement 51 to be shown in the advertising interface area 50. The advertisers may also provide computer executable instructions for generating the advertising interface area 50 and/or an animation used to provide an initial "splash" when users select the advertising corner control interface area 52. The advertisers would also provide payment information so that they can be charged as users interact with their advertisements in the manner described previously.

In certain examples, advertisers will be provided with a web interface to track their advertising campaigns (such as by tracking how often users select advertising corner control interface area 52 or advertising interface area 50 with a particular advertiser's advertising and graphic content).

In certain examples, application publishers will also subscribe to receive the above-described SDK. In accordance with such examples, the application publishers will sign up for an account with the SDK provider. The SDK provider will provide a publisher key that uniquely identifies the application publisher. The application publisher will then download the SDK or receive it via a computer readable medium (e.g., a CD or DVD). The publisher will then submit a description of the application to the SDK provider so that the SDK provider can identify suitable advertisers. The SDK provider will then provide the SDK to the application publisher who can then implement the SDK, for example, by creating an application interface view object and wrapping it in the SDK's parent view object, as described previously.

EXAMPLE

The following Java source code is an example of a software development kit in accordance with the present disclosure.

The code defines a parent view object called "PascharUIFrameLayout" which is based on an inheritance of the Android operating system class FrameLayout. The parent view object includes a first child view object called mAdvertisingCorner which is an advertising corner control interface view object that generates an advertising corner control interface area when executed by a computer processor running the Android operating system. In this example, the advertising corner control interface area is displayed in the bottom right hand corner of the mobile device display. The parent view object also includes a second child view object called mFullAdImage which is an advertising interface view object that generates an advertising interface view area when executed by a computer processor running the Android operating system.

The foregoing descriptions of specific embodiments have been presented for purposes of illustration and description. They are not intended to be exhaustive or to limit the invention to the precise forms disclosed. Many modifications and variations are possible in light of the above teachings, with modifications and variations suited to the particular use contemplated.

What is claimed is:

1. A software development kit, comprising:

A non-transitory computer readable medium having computer executable instructions stored thereon which perform the following steps when executed by a mobile device computer processor in a mobile device having a display:

generating an advertising corner control interface area on the mobile device display, the advertising corner control interface area comprising a graphic including content, wherein when the mobile device is in a first rotational orientation in a plane perpendicular to the Earth's surface, the graphic is located in a first corner of the mobile device display, and the graphic is selectable by a first selection technique to cause an advertising interface area to be visible on the mobile device display, wherein the advertising interface area has advertising content related to the graphic content, and the computer executable instructions comprise an object oriented programming parent view object that includes an object oriented programming advertising corner control interface area view object that defines the advertising corner control interface area and in which advertising corner control interface view object a developer can wrap an object oriented programming application interface area view object and which parent view object further includes an object oriented advertising interface view object that defines the advertising interface area, such that when the object oriented programming advertising corner control interface area view object and the object oriented programming application interface area view object are executed by the mobile device computer processor, the advertising corner control interface area and an application interface area defined by the object oriented programming application interface area view are simultaneously displayed on the mobile device display without including code for defining the advertising corner control interface area in the object oriented programming application interface area view object, and wherein when an object oriented programming application interface view object defining an application interface area is wrapped in the object oriented programming parent view object and a user scrolls application user interface content displayed on the mobile device display relative to an application interface area reference location while maintaining the mobile device in the first rotational orientation, the advertising corner control interface area remains displayed in the first corner of the mobile device display.

2. The software development kit of claim 1, wherein when executed by the mobile device computer processor the computer executable instructions perform the further step of generating the advertising interface area.

3. The software development kit of claim 1, wherein when the advertising corner control interface area is displayed on the mobile device display, the advertising interface area is not visible.

4. The software development kit of claim 1, wherein the first rotational orientation is a portrait rotational orientation and when the mobile device display is rotated into a second landscape rotational orientation in the plane perpendicular to the Earth's surface, the advertising corner control interface area is in a second corner of the mobile device display.

5. The software development kit of claim 1, wherein when the mobile device display is rotated from a portrait orientation to a landscape orientation in the plane perpendicular to the Earth's surface, the location of the advertising corner control interface area on the display remains fixed relative to an application interface area reference location.

6. The software development kit of claim 1, wherein the object oriented programming parent view object is an operating system parent view object.

7. The software development kit of claim 1, wherein the graphic occupies a number of pixels on the mobile device display, and the number of pixels remains fixed when the mobile device display is rotated from a portrait rotational orientation to a landscape rotational orientation in the plane perpendicular to the Earth's surface.

8. The software development kit of claim 1, wherein the graphic occupies an area on the mobile device display that is from about two percent to about fifteen percent of the mobile device display area.

9. The software development kit of claim 1, wherein the graphic is selectable by a second selection technique to cause the advertising corner control interface area to disappear from the mobile device display.

10. The software development kit of claim 1, wherein when executed by the mobile device computer processor, the computer executable instructions perform the further step of retrieving the graphic content from a server.

11. The software development kit of claim 1, wherein the computer executable instructions perform the further step of retrieving the advertising content from a server.

12. A non-transitory computer readable medium having computer executable instructions programmed thereon which comprise an object oriented programming advertising corner control interface area view object for generating an advertising corner control interface area on a mobile device display, wherein the instructions for generating the advertising corner control interface area comprise a software development kit, the software development kit comprises an object oriented programming parent view object, and when an object oriented programming application interface area view object is wrapped in the object oriented programming advertising corner control interface area view object, the instructions perform the following steps when executed by a mobile device computer processor in a mobile device having a display:

displaying the advertising corner control interface area in a first corner of the mobile device display, wherein the advertising corner control interface area includes a graphic that includes content, the advertising corner control interface area overlays part of an application interface area that is defined by the object oriented programming application interface area view object, and when a user selects the advertising corner control interface area using a first selection technique, the application interface area and the advertising corner control interface area disappear from the mobile device display to display an advertising interface area having advertising content related to the graphic content.

13. The non-transitory computer readable medium of claim 12, wherein when executed by the mobile device computer processor, the computer executable instructions perform the further steps of generating the advertising interface area and generating the application interface area.

14. The non-transitory computer readable medium of claim 12, wherein when executed by the mobile device computer processor, the computer executable instructions perform the further step of retrieving the advertising content from a server.

15. The non-transitory computer readable medium of claim 12, wherein when executed by the mobile device computer processor, the computer executable instructions perform the further step of retrieving the graphic content from a server.

16. The non-transitory computer readable medium of claim 12, wherein the advertising corner control interface area occupies a fixed area of fixed dimensions on the mobile device display as the mobile device display is rotated from a portrait orientation to a landscape orientation in a plane perpendicular to the Earth's surface.

17. The non-transitory computer readable medium of claim 12, wherein the step of displaying the advertising corner control interface area comprises displaying the graphic such that when a user scrolls application content relative to an application interface area reference location while maintaining the mobile device in a fixed rotational orientation in a plane perpendicular to the Earth's surface, the location of the graphic on the mobile device display remains fixed.

18. The non-transitory computer readable medium of claim 12, wherein when a user selects the advertising corner control interface using a second selection technique, the advertising corner control interface area disappears from the mobile device display, and the application interface area remains displayed on the display.

19. A method of providing a mobile device application user interface with a dynamic advertising feature to a user, the method comprising:
providing a software development kit comprising a first set of computer executable instructions, wherein the first set of computer executable instructions comprises an object oriented programming parent view object that includes an object oriented programming advertising corner control interface view object defining an advertising corner control interface area on a mobile device display, the advertising corner control interface area including a graphic having advertising content;
providing a second set of computer executable instructions comprising an object oriented programming application interface view object defining an application interface area on a mobile device display, wherein the object oriented programming application interface view object is wrapped in the parent view object;
executing the first and second sets of computer executable instructions with a mobile device computer processor in a mobile device having a mobile device display to generate the application interface area on the mobile device display and to generate the advertising corner control interface area on the mobile device display such that the advertising corner control area is in a first corner of the mobile device display, wherein the step of executing the first and second sets of computer executable instructions causes the application interface area to be displayed on top of an advertising interface area having advertising content related to the graphic advertising content such that the advertising interface area is not visible.

20. The method of claim 19, wherein the entire advertising corner control interface area is selectable using a first selection technique to display the advertising interface area.

21. The method of claim 20, wherein the entire advertising corner control interface area is selectable using a second selection technique to remove the advertising corner control interface area from the mobile device display.

22. The method of claim 19, wherein when executed by the mobile device computer processor, the first set of computer instructions further retrieves the advertising interface area's advertising content from a server.

23. The method of claim 19, wherein when executed by the mobile device computer processor, the first set of computer instructions further retrieves the graphic advertising content from a server.

24. The method of claim 19, wherein the application interface area includes scrollable application interface content, and when a user scrolls the application interface content relative to an application interface area reference location, the location of the graphic on the display remains fixed relative to the application interface area reference location.

25. The method of claim 24, wherein when the mobile display is rotated from a portrait rotational orientation to a landscape rotational orientation in a plane perpendicular to the Earth's surface, the location of the graphic on the display remains fixed relative to the application interface area reference location.

* * * * *